United States Patent

[11] 3,556,121

[72] Inventor Thomas F. Urbanosky Cincinnati, Ohio
[21] Appl. No. 780,348
[22] Filed Dec. 2, 1968
[45] Patented Jan. 19, 1971
[73] Assignee General Electric Company a corporation of New York

[54] FLUERIC MULTIPLIER

8 Claims, 8 Drawing Figs.

[52] U.S. Cl. .......... 137/81.5, 235/201
[51] Int. Cl. .......... F15c 1/14, F15c 4/00
[50] Field of Search .......... 137/81.5; 235/201

[56] References Cited

UNITED STATES PATENTS

| | | | |
|---|---|---|---|
| 3,369,557 | 2/1968 | Wood | 137/81.5 |
| 3,461,899 | 8/1969 | DiCamillo | 137/81.5 |
| 3,468,328 | 9/1969 | Metzger | 137/81.5 |

*Primary Examiner*—William R. Cline
*Attorneys*—Derek P. Lawrence, Lee H. Sachs, Frank L. Neuhauser, Oscar B. Waddell, Thomas J. Bird, Jr. and Joseph B. Forman

ABSTRACT: A flueric multiplier stage is disclosed which comprises two fluid amplifiers whose power streams are respectively connected to opposite sides of a first pressure differential signal and whose control ports are connected in parallel across a second pressure differential signal. The output receivers of the fluid amplifiers are cross-connected such that the left receiver of the first amplifier is connected to the right receiver of the second amplifier, the structure described being adapted to provide a push-pull output signal which is proportional to the product of two push-pull input signals. Circuits incorporating the basic multiplier stage are also disclosed, as are circuits in which the output is restricted to respond to a singularly directional input.

INVENTOR.
THOMAS F. URBANOSKY
BY
Loren W. Peters
ATTORNEY

INVENTOR.
THOMAS F. URBANOSKY
BY
Loren W. Peters
ATTORNEY

FLUERIC MULTIPLIER

BACKGROUND OF THE INVENTION

This invention relates to multipliers for use in control and analogue computing circuits and, more particularly, to flueric devices adapted to perform multiplication functions. (The term flueric is a term of art which indicates that a particular operational system or subsystem performs its function without the aid of mechanical devices. The broader term, fluidic, denotes an operational system, subsystem, or element, in which the output function is performed with the aid of electrical or mechanical devices).

In the automatic control fields it is often necessary to generate controller input or feedback functions which are the product of two or more parameters or which are the product of one parameter multiplied by itself one or more times, or combination of both. Several electrical and mechanical devices for performing the described functions are available to the control designer. The available devices are however often complex or permit operation only within relatively narrow environmental limits. The fluidic art, however, has developed to a point where there is available to the designer a collection of highly reliable basic building blocks which are not narrowly limited by environment. This invention has therefore been directed to incorporation of these fluidic elements into a circuit which will perform the desired multiplication operations efficiently and reliably.

OBJECTS OF THE INVENTION

It is an object of this invention therefore to provide a multiplier stage which comprises a relatively simple flueric circuit.

A further object of this invention is to provide a flueric multiplier stage which can be combined with other such stages to provide for successive multiplications or the creation of exponential function.

A still further object of this invention is provision of a multiplier capable of generating a push-pull output signal which is the product of two push-pull input signals.

SUMMARY OF THE INVENTION

Briefly stated, this invention in its broadest aspect is a multiplier which comprises two fluid amplifiers whose power nozzles are respectively connected to opposite sides of an input differential pressure signal and whose control ports are connected in parallel across a second input differential pressure signal. A preferred embodiment of the invention also includes interconnection by suitable passageway means of the right receiver of the first fluid amplifier to the left receiver of the second fluid amplifier and the left receiver of the first fluid amplifier to the right receiver of the second fluid amplifier, thereby providing capability of generating a push-pull output signal which is a product of two push-pull input signals.

DESCRIPTION OF THE DRAWINGS

While the invention is particularly pointed out and distinctly claimed at the end of this specification, it will be more clearly understood by reference to the explanatory text below and the accompanying drawings in which:

DESCRIPTION OF THE PREFERRED EMBODIMENTS

Figure 1:
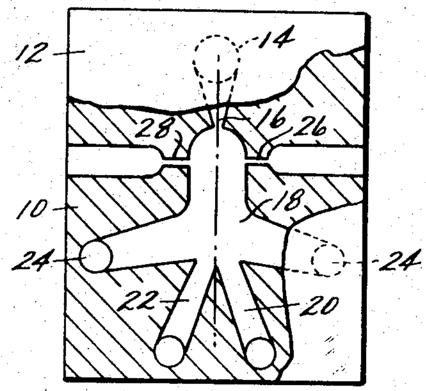
FIG. 1 is a partially fragmented plan view of a fluid amplifier.
Figure 2:
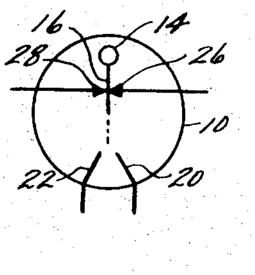
FIG. 2 is a diagrammatic view of the amplifier shown in FIG. 1.
Figure 3:
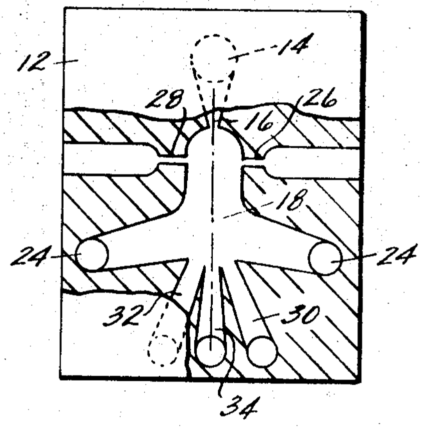
FIG. 3 is a partially fragmented plan view of another fluid amplifier.

Referring to the drawings, FIGS. 1 through 4 illustrate two basic fluid amplifiers and their diagrammatic equivalents. The amplifiers shown in FIGS. 1 and 3 are conventionally constructed in that they comprise at least two elements, a base member 10 wherein a fluid flow configuration is provided, as by etching or machining the fluid passageways, and a flat cover member 12 attached to the base 10 for confining fluid flow within the paths defined by the configuration and the enclosing surface of cover member 12. The base member 10 may be formed of any suitable nonporous structurally rigid material, such as metal, glass, plastic or the like, which is slotted in the special configuration to provide fluid passages. The cover plate 12, which is shown partly broken away, can be made of similar materials, and held in fluid tight arrangement with the base member by any number of suitable means such as, for example, screws, clamping means, and adhesive materials. The slots which define the fluid passages are preferably rectangular in cross section Referring specifically to FIG. 1, the fluid amplifier shown comprises a power stream inlet 14, a power nozzle 16 in communication with the said inlet, a fluid interaction chamber 18 at the power nozzle exit, a pair of receivers 20, 22 symmetrically disposed about the power nozzle 16 axis, venting means 24 for maintaining the pressure in the interaction chamber 18 at a low value such as system ambient, and a pair of control ports 26, 28 disposed oppositely of the axis of the power nozzle near the exit thereof. Suitable connecting means are provided to connect the control ports, the vent ports and the receivers to suitable exterior points. FIG. 2 shows the amplifier of FIG. 1 in diagrammatic form with each diagrammatic equivalent of the elements shown in FIG. 1 similarly numbered.

Figure 4:
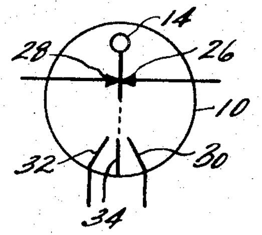
FIG. 4 is a diagrammatic view of the amplifier shown in FIG. 3.

FIG. 3 illustrates a fluid amplifier which is identical with that of FIG. 1 insofar as its power stream means, control means and vent means are concerned (which means are numbered identically with the corresponding elements in FIG. 1), but which differs however from that of FIG. 1 in the receiver area. The amplifier shown in FIG. 3 includes three receivers, 30, 32, 34, one of which is disposed on the axis of the power nozzle, and the other two of which are symmetrically oppositely disposed thereof. Size and spacing of the three receivers 30, 32, 34 is such that when the power stream is operating unaffected by control signals across the control ports its total output is directed into the central receiver 34, and slight deviations from this null position will be reflected by capture of some of the power stream in either the right receiver 32 or left receiver 30 as the case may be. The object of this structure is to provide a fluid amplifier in which the output from the left and right receivers 30, 32 will be a linear function of the differential pressure across the control ports 26, 28, which function will pass through zero when the differential pressure across the control ports 26, 28 equal zero. The structure shown in FIG. 3 is only one means for accomplishing the desired element objective; other structures may be available which do not use the center receiver 34 but use other means for spoiling the effect of the power stream on the left and right receivers 30, 32 when the control signal is zero. FIG. 4 diagrammatically illustrates the fluid amplifier shown in FIG. 3 with the corresponding elements being similarly numbered.

Figure 5:
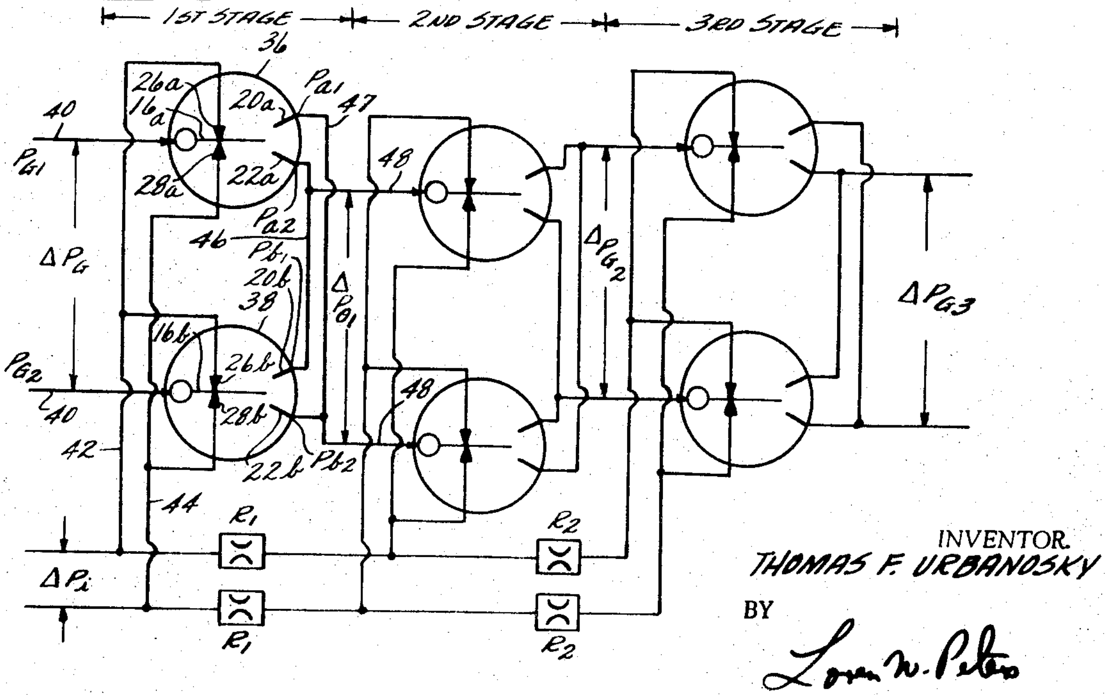
FIG. 5 is a diagrammatic view of a multistage flueric multiplier.

FIG. 5 illustrates several multiplier stages cascaded to provide successive multiplications. Operation of the multiplier can be best understood by reference to the first stage which comprises two flueric devices 36, 38 such as those shown by FIG. 1. The input to the power nozzle 16*a* of first flueric device 36 is labeled $P_{g1}$ and that to the power nozzle 16*b* of the second flueric device 38 is labeled $P_{g2}$, and the respective inputs are provided from opposite sides of a differential pressure source by suitable conduits 40. Outputs from the receivers are labeled $P_{a1}$ and $P_{a2}$ respectively for the left and right receivers 20a, 22a of the first device 36 and $P_{b1}$ and $P_{b2}$ respectively for the left and right receivers 20b, 22b of the second device 38. Each flueric device 36, 38 has a pressure differential $\Delta P_i$ impressed across its control ports 26, 28 in the same direction, the pressures $P_{i1}$ and $P_{i2}$ being transmitted from a pressure signal source to the control ports 26, 28 via suitable conduits 42, 44.

On the output side, the left receiver 20a of the first device 36 is connected to the right receiver 22b of the second device 38 by suitable conduit or passageway means 47 and the right receiver 22a of the first device 36 is similarly connected to the left receiver 20b of the second device 38 by conduit 46. Output of the stage, labeled $\Delta P_{o1}$ is the differential pressure between the respective right receivers 22 and the respective left receivers 20 and can be transmitted to a succeeding stage or output load by suitable conduits or passageways.

Referring now to the pressure designations of FIG. 5 and keeping in mind that the output of the flueric devices 36, 38 can be expressed as a multiple of the product of power stream supply pressure and control port 26, 28 pressure differential:

$$P_{a1} - P_{a2} = K P_{G1} \Delta P_i$$

$$P_{b1} - P_{b2} = K P_{G2} \Delta P_i$$

$P_{a1} = P_{b2}$ and $P_{b1} = P_{a2}$ by virtue of the cross connection between receivers 20a — 22b, 22a — 20b, then $P_{a2} - P_{b2} = \frac{K}{2}(P_{G1} - P_{G2})\Delta P_i$ or $\Delta P_{o1} = K_1 \Delta P_i \Delta P_G$, i.e., the stage output is proportional to the product of the two input signals.

If the first stage output, $\Delta P_{o1}$, is the input for the second stage as shown and the second stage $\Delta P_i$ is the same $\Delta P_i$ as for the first stage, the output of the second stage becomes $\Delta P_{o2} = K_1 \Delta P_G (\Delta P_i)^2$, and by parity of reasoning, the output of an nth stage is $\Delta P_{on} = K_1 \Delta P_G (\Delta P_i)^n$. Thus FIG. 5 illustrates a useful multiplier for successive multiplication of a number by itself wherein the multiplier has a variable gain $\Delta P_G$.

If the circuit of FIG. 5 is slightly modified so that each stage has an independent $\Delta P_i$, the multiplier will have an output $\Delta P_{on} = K_1 \Delta P_G (\Delta P_{i1}) (\Delta P_{i2}) (\Delta P_{i3}) .. (\Delta P_{in})$. The multiplier circuit can of course be connected so that any combination of $(\Delta P_i)^X 1\ (\Delta_i)^X 2\ (\Delta P_i)^X n$ multiplications can be handled wherein X has a value of zero or any positive integer.

Figures 6, 7, 8:
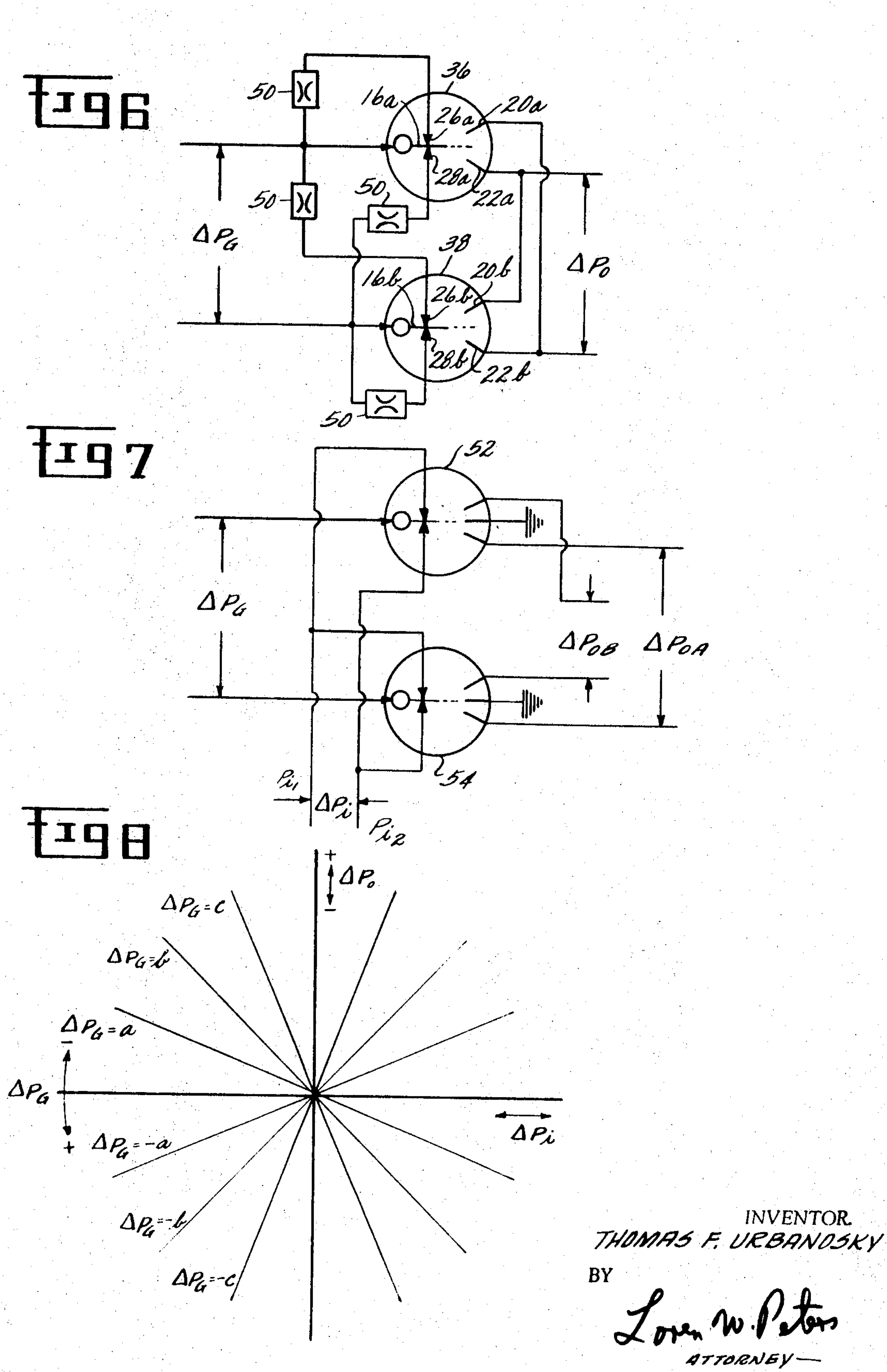
FIG. 6 is a diagrammatic view of a single stage flueric multiplier adapted to square the input signal.
FIG. 7 is a diagrammatic view of a single stage flueric multiplier in which the output is limited to the product of one push-pull input signal and one unidirectional input signal.
FIG. 8 is a diagrammatic view illustrating the input-output characteristic of a push-pull multiplier stage.

FIG. 6 illustrates a single stage multiplier, such as that shown as the first stage of FIG. 5, wherein the fluid amplifier control ports 26, 28 are connected in parallel across the power nozzle 16a, 16b inputs $P_{G1}$ and $P_{G2}$, and flow resistive devices 50 such as flat plate orifices are provided in the conduits to the control ports 26, 28 to reduce the power stream input pressures, $P_{G1}$ and $P_{G2}$, to levels which are acceptable for control purposes. Thus, as can be seen by reference to the equations which were developed above, wherein a constant times $\Delta P_G$ is substituted for the value of $\Delta P_i$, a single stage multiplier capable of providing an output which is the square of its input is shown.

FIG. 7 illustrates a multiplier stage in which the fluid amplifier 52, 54 receivers 30, 32 are not cross-connected as was shown in FIGS. 5 and 6, and in which the fluid amplifier elements are constructed such that when the control signal is at null, i.e., $\Delta P_i$ equals zero, the output pressure in each reciever 30, 32 is equal to zero and the amplifier has a linear output characteristic which passes through zero at null. This of course is the fluid amplifier described above in connection with FIG. 3. As can be seen from the FIG. 7 schematic, when $\Delta P_i$ is characterized by a condition in which $P_{i1}$ exceeds $P_{i2}$ there will be an output, designated $\Delta P_{oa}$, appearing across the right receivers of the two amplifier elements. Similarly when the polarity of the $\Delta P_i$ signal is reversed, an output, $P_{ob}$, will appear across the left receivers of the two fluid amplifier elements and no signal will appear across the right receivers of the same elements. The circuit described thus provides a degenerate version of the multiplier of FIG. 5 in which, for example, a push-pull input signal such as that designated $\Delta P_G$ can be amplified by a variable unidirectional gain function.

FIG. 8 illustrates the input-output characteristic of a typical fluid amplifier stage constructed as described in connection with FIG. 5 above. The characteristic comprises a family of straight lines for differing values of input, designated $\Delta P_G$, across the power nozzles 16a, 16b, in which the ordinate presents the input $\Delta P_i$ and the abcissa designates the output $\Delta o$. The nature of this characteristic has been experimentally verified.

Where the circuit shown by FIG. 7 is used, the output would appear as either the right half or the left half of the characteristic shown in FIG. 8, depending upon whether $\Delta P_i$ was negative or positive with respect to the particular output signal read.

The text above describes several embodiments of the applicant's invention which are adapted to provide an efficient and reliable multiplication function. It is not however intended to limit the invention to the specific embodiments described, all reasonable equivalents being intended to fall within the scope of the appended claims.

I claim:

1. A flueric multiplier stage comprising:

a first flueric device and a second flueric device, each said flueric device including a power nozzle for generation of a power stream, a left control port and a right control port, and receiver means adapted for a recovery of pressure from said power stream in proportion to the difference between the pressures applied to said control ports;

a first conduit connecting the power nozzle of said first device to a first external pressure source;

a second conduit connecting the power nozzle of said second device to a second external pressure source; the pressure differential between said first and second conduits providing one input to the multiplier stage;

a third conduit interconnecting said left control ports with a third pressure source; and a fourth conduit interconnecting said right control ports with a fourth pressure source, the pressure differential between said third and fourth conduits providing a second input to the multiplier stage;

whereby the pressure differential between corresponding elements of said receiver means will be a multiple of the product of the pressure differential between said first and second conduits and the pressure differential between said third and fourth conduits.

2. The flueric multiplier stage recited in claim 1 wherein said receiver means are symmetrically disposed with respect to the power nozzle axis.

3. The flueric multiplier stage of claim 2 wherein the said receiver means is disposed with respect to the power stream axis to provide pressure recovery in said receiver means which will continuously vary from zero to a finite value as control port pressure differential varies from zero to a finite value.

4. The flueric multiplier stage of claim 3 wherein each flueric device includes a left receiver and a right receiver respectively disposed on opposite sides of the power nozzle axis whereby the pressure differential between said right receivers will be a multiple of the product of the pressure differential between said first and second conduits and the pressure differential between said third and fourth conduits when the pressure in said third conduit exceeds that in said fourth conduit, and the pressure differential between said left receivers will represent the same product when the pressure in said fourth conduit exceeds that in said third conduit.

5. The flueric multiplier stage of claim 2 wherein each flueric device includes a left receiver and a right receiver oppositely disposed with respect to the axis of the power nozzle, and wherein is added a conduit connecting the left receive of said first device with the right receiver of said second device and a conduit connecting the right receiver of said first device with the left receiver of said second device whereby there is provided a push-pull circuit in which the pressure differential between the said right receivers and the pressure differential between the said left receivers is a constant multiple of the product of the differential pressure between said first and second conduits and the differential pressure between said third and fourth conduits.

6. The flueric multiplier stage of claim 5 wherein the said third conduit is connected with one of said first and second conduits, and the said fourth conduit is connected with the other of said first and second conduits whereby the pressure differential between the said right receivers and the pressure differential between the said left receivers is a multiple of the square of the differential pressure between the said first and second conduits.

7. The flueric multiplier stage of claim 5 in combination with a second said flueric multiplier stage wherein the first conduit of said second stage is interconnected with one of the receivers of one of said flueric devices in the first stage and the second conduit of said second stage is interconnected with the correspondingly located receiver in the other of said first stage flueric devices.

8. The combination of claim 7 wherein the third and fourth conduits of said second stage are commonly connected with the third and fourth conduits of the first stage to respective pressure sources.